(12) United States Patent
Takezawa

(10) Patent No.: US 12,157,400 B2
(45) Date of Patent: Dec. 3, 2024

(54) DISPLAY CONTROL DEVICE, VEHICLE, DISPLAY CONTROL METHOD, AND NON-TRANSITORY MEMORY MEDIUM

(71) Applicant: TOYOTA JIDOSHA KABUSHIKI KAISHA, Toyota (JP)

(72) Inventor: Ayaka Takezawa, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 400 days.

(21) Appl. No.: 17/571,955

(22) Filed: Jan. 10, 2022

(65) Prior Publication Data

US 2022/0281323 A1    Sep. 8, 2022

(30) Foreign Application Priority Data

Mar. 5, 2021    (JP) .................................. 2021-035784

(51) Int. Cl.
*B60L 8/00*    (2006.01)
*B60L 1/00*    (2006.01)

(52) U.S. Cl.
CPC .............. *B60L 8/003* (2013.01); *B60L 1/006* (2013.01); *B60K 2360/169* (2024.01); *B60L 2240/32* (2013.01); *B60L 2250/16* (2013.01); *B60L 2260/52* (2013.01); *B60L 2260/54* (2013.01); *B60W 2510/244* (2013.01)

(58) Field of Classification Search
None
See application file for complete search history.

(56) References Cited

U.S. PATENT DOCUMENTS

| | | | |
|---|---|---|---|
| 2010/0169008 A1* | 7/2010 | Niwa | G09B 29/106 |
| | | | 701/532 |
| 2016/0272069 A1* | 9/2016 | Maeno | B60L 3/00 |
| 2019/0165589 A1* | 5/2019 | Ichikawa | B60L 58/12 |
| 2022/0153143 A1* | 5/2022 | Gaither | B60L 15/20 |
| 2023/0223889 A1* | 7/2023 | Sarkar | H02S 20/30 |
| | | | 320/101 |

FOREIGN PATENT DOCUMENTS

| | | |
|---|---|---|
| JP | 2010-119160 A | 5/2010 |
| JP | 2012-242329 A | 12/2012 |
| JP | 2014-213843 A | 11/2014 |
| JP | 2016-141161 A | 6/2016 |
| JP | 2019-97333 A | 6/2019 |
| WO | WO-2011123690 A1 * | 10/2011 ............. B60K 35/00 |

\* cited by examiner

*Primary Examiner* — Peter D Nolan
*Assistant Examiner* — Michael F Whalen
(74) *Attorney, Agent, or Firm* — Oblon, McClelland, Maier & Neustadt, L.L.P.

(57) ABSTRACT

A display control device includes a memory and a processor coupled to the memory. The processor is configured to acquire a momentary power generation amount of a solar power generation device mounted at a vehicle and, in accordance with the acquired momentary power generation amount, change an area of a display region displayed at a display part of the vehicle.

13 Claims, 8 Drawing Sheets

DISPLAY CONTROL DEVICE, VEHICLE, DISPLAY CONTROL METHOD, AND NON-TRANSITORY MEMORY MEDIUM

CROSS-REFERENCE TO RELATED APPLICATION

This application is based on and claims priority under 35 USC 119 from Japanese Patent Application No. 2021-035784 filed on Mar. 5, 2021, the disclosure of which is incorporated by reference herein.

BACKGROUND

Technical Field

The present disclosure relates to a display control device, a vehicle, a display control method and a control program.

Background Art

For example, Japanese Patent Application Laid-Open (JP-A) No. 2019-097333 discloses displaying a state of charge (SOC) of an electricity storage device of a vehicle at a display device with respective sources of electricity stored at the electricity storage device being distinguished.

In the electricity storage device disclosed in JP-A No. 2019-097333, an SOC based on power generation from a solar power generation device at the exterior of the vehicle is displayed. However, when a solar power generation device is mounted at a vehicle, there is scope for improvement in regard to intuitively reporting to a user a momentary power generation amount of electricity that is currently being generated.

SUMMARY

The present disclosure provides a display control device, a vehicle, a display control method and a control program that, when a solar power generation device mounted at a vehicle generates power, enable intuitive reporting of momentary power generation amounts to a user.

A display control device according to a first aspect includes: an acquisition section that acquires a momentary power generation amount of a solar power generation device mounted at a vehicle; and a control section that, in accordance with the acquired momentary power generation amount, changes an area of a display region displayed at a display part of the vehicle.

In the display control device according to the first aspect, the control section changes the area of the display region displayed at the display part in accordance with momentary power generation amounts acquired by the acquisition section. Therefore, according to this display control device, when the solar power generation device mounted at the vehicle generates electric power, momentary power generation amounts may be intuitively reported to a user.

In a display control device according to a second aspect, the display control device according to the first aspect further includes a vehicle calculation section that calculates a potential running distance of the vehicle based on an amount of power generated by the solar power generation device, wherein the control section display the potential running distance at the display part.

In the display control device according to the second aspect, when the vehicle calculation section calculates a potential running distance of the vehicle based on an amount of power generated by the solar power generation device, the control section causes the display part to display the potential running distance. Therefore, according to this display control device, both momentary power generation amounts and a distance that the vehicle may run according to a result of integration of the momentary power generation amounts may be provided to the user.

In a display control device according to a third aspect, the display control device according to the first aspect or the second aspect further includes an equipment calculation section that calculates a potential usage amount of equipment other than the vehicle based on an amount of power generated by the solar power generation device, wherein the control section displays the potential usage amount at the display part.

In the display control device according to the third aspect, when the equipment calculation section calculates a potential usage amount for equipment other than the vehicle based on an amount of power generated by the solar power generation device, the control section causes the display part to display the potential usage amount. Therefore, according to this display control device, both momentary power generation amounts and amounts that may be used by devices other than the vehicle according to a result of integration of the momentary power generation amounts may be provided to the user. Potential usage amounts encompass durations and numbers of occasions that use is possible.

In a display control device according to a fourth aspect, the display control device according to any one of the first to third aspects further includes an estimation section and a determination section, wherein: the acquisition section acquires an orientation of the vehicle; the estimation section estimates a momentary power generation amount for each of respective orientations of the vehicle; for a predetermined parking location, the determination section determines a parking direction of the vehicle at which the momentary power generation amount estimated by the estimation section is largest; and the control section displays information of the determined parking direction at the display part.

In the display control device according to the fourth aspect, the estimation section estimates respective momentary power generation amounts for orientations of the vehicle, and the determination section determines a parking direction in a predetermined parking location for which the estimated momentary power generation amount is largest. The control section causes the display part to display information regarding the determined parking direction. According to this display control device, power generation amounts during parking may be increased by giving guidance to the user about the parking direction for which momentary power generation amounts will be largest before the vehicle is parked.

A vehicle according to a fifth aspect includes: the display control device according to any one of the first to fourth aspects; the solar power generation device, the solar power generation device being coupled to the display control device; and the display part, the display part being coupled to the display control device.

According to the vehicle of the fifth aspect, when the solar power generation device mounted at the vehicle generates electric power, momentary power generation amounts may be intuitively reported to a user of the vehicle.

A display control method according to a sixth aspect includes a computer executing processing including: acquiring a momentary power generation amount of a solar power generation device mounted at a vehicle; and in accordance with the acquired momentary power generation amount, changing an area of a display region displayed at a display part of the vehicle.

In the display control method according to the sixth aspect, the computer changes the area of the display region displayed at the display part in accordance with acquired momentary power generation amounts. Therefore, according to this display control method, when the solar power generation device mounted at the vehicle generates electric power, momentary power generation amounts may be intuitively reported to a user.

A control program according to a seventh aspect is executed by a computer to execute processing including: acquiring a momentary power generation amount of a solar power generation device mounted at a vehicle; and in accordance with the acquired momentary power generation amount, changing an area of a display region displayed at a display part of the vehicle.

The control program according to the seventh aspect causes a computer to execute the following processing: The computer changes the area of the display region displayed at the display part in accordance with acquired momentary power generation amounts.

Therefore, according to this control program, when the solar power generation device mounted at the vehicle generates electric power, momentary power generation amounts may be intuitively reported to a user.

According to the present disclosure, when a solar power generation device mounted at a vehicle generates power, momentary power generation amounts may be intuitively reported to a user.

BRIEF DESCRIPTION OF THE DRAWINGS

Exemplary embodiments of the present invention will be described in detail based on the following figures, wherein.

DETAILED DESCRIPTION

Below, examples of embodiments of the present disclosure are described in detail with reference to the attached drawings.

First Exemplary Embodiment

Figure 1:
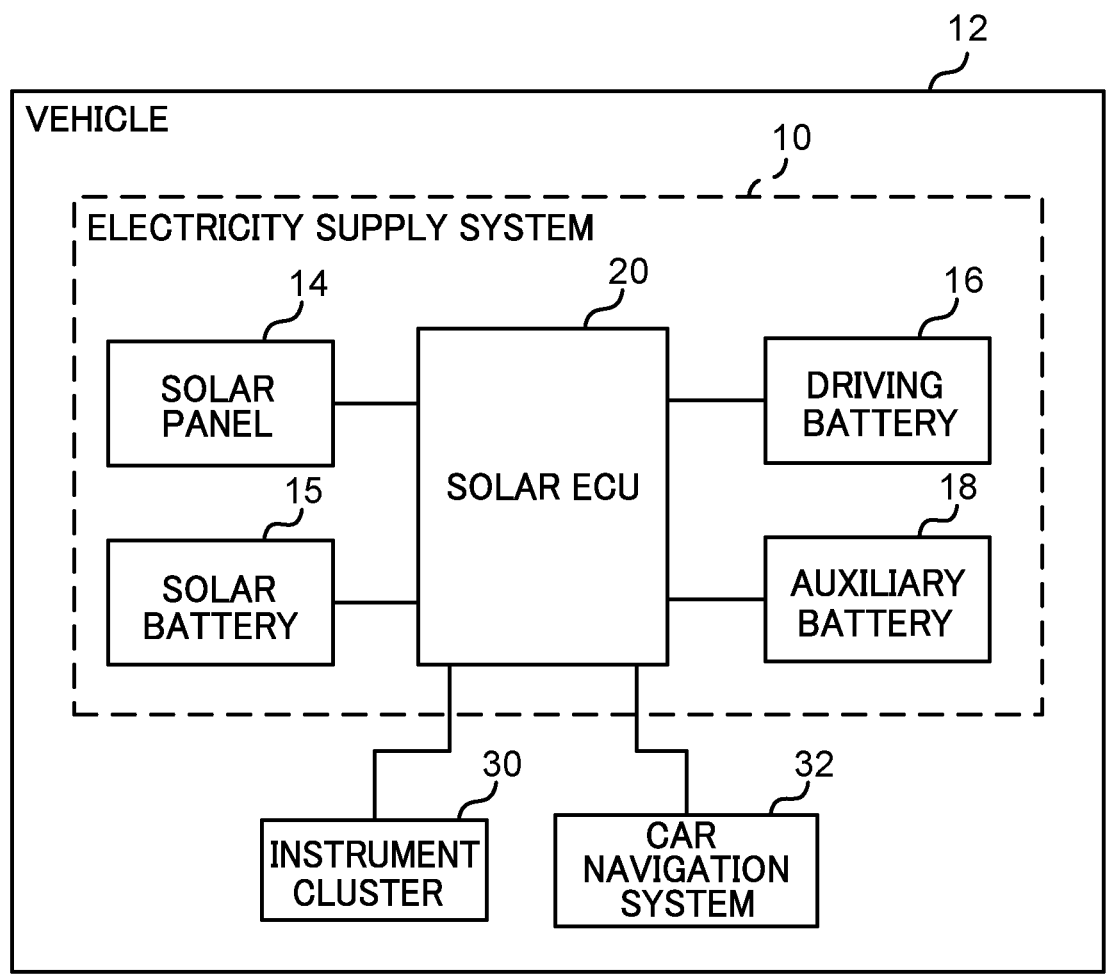
FIG. 1 is a schematic structural diagram of a vehicle and an electricity supply system according to a first exemplary embodiment.

As shown in FIG. 1, an electricity supply system 10 according to the first exemplary embodiment is installed at a vehicle 12. Examples of the vehicle 12 include a battery electric vehicle (BEV) or a hybrid electric vehicle (HEV). The vehicle 12 according to the present exemplary embodiment is equipped with a solar panel 14, which is a solar power generation device. Electric power generated at the solar panel 14 may be supplied to equipment sets of the vehicle 12. In the present exemplary embodiment, a driving battery 16 and an auxiliary battery 18, which are described below, may be charged up by electric power generated at the solar panel 14.

In addition to the electricity supply system 10, the vehicle 12 includes at least an instrument cluster 30 and a car navigation system 32.

The instrument cluster 30 serves as a display part and includes a liquid crystal monitor that displays various kinds of information of the vehicle 12.

The car navigation system 32 is a device that displays a current position and orientation of the vehicle 12 on an electronic map.

The electricity supply system 10 includes a solar ECU 20 that serves as a display control device, the solar panel 14, a solar battery 15, the driving battery 16 and the auxiliary battery 18. The solar ECU 20 includes functions for controlling electric power generated at the solar panel 14. Details of the solar ECU 20 are described below.

The solar panel 14 is a solar cell module, which is power generation equipment that is insolated with solar light and generates electric power. The solar panel 14 is disposed, for example, at a roof or the like at the exterior of the vehicle 12. The solar panel 14 is coupled to the solar ECU 20.

The solar battery 15 is a battery for temporarily storing electricity. The solar battery 15 is structured by a rechargeable secondary battery such as, for example, a lithium-ion battery, a nickel hydride battery or the like. The solar battery 15 stores electricity generated by the solar panel 14 and supplies the generated electricity to the driving battery 16 and the auxiliary battery 18. The solar battery 15 is coupled to the solar ECU 20.

The driving battery 16 is a high voltage battery for operating a driving device such as a running motor or the like relating to driving of the vehicle 12. The driving battery 16 is structured by a rechargeable secondary battery such as, for example, a lithium-ion battery, a nickel hydride battery or the like. The driving battery 16 is coupled to the solar ECU 20. The driving battery 16 is coupled to the running motor via a power control unit. The driving battery 16 supplies electric power to the running motor at times of acceleration of the vehicle 12, and receives supplies of electric power from the running motor at times of deceleration.

The auxiliary battery 18 is a battery that may operate auxiliary equipment other than equipment relating to driving of the vehicle 12. The auxiliary battery 18 is structured by a rechargeable secondary battery such as, for example, a lithium-ion battery, a nickel hydride battery or the like. The auxiliary battery 18 is coupled to the solar ECU 20.

The solar ECU 20 includes functions for supplying electricity generated at the solar panel 14 to the solar battery 15 and for supplying electricity stored at the solar battery 15 to the driving battery 16 and the auxiliary battery 18. The solar ECU 20 includes functions for displaying power generation states of the solar battery 15 at the instrument cluster 30.

The solar ECU 20 includes a solar DC-DC converter that supplies electric power generated by the solar panel 14 to the solar battery 15, and a step-up DC-DC converter (not shown in the drawings) that raises the voltage of electric power from the solar battery 15 and supplies the electric power to the driving battery 16. The solar ECU 20 also includes a step-down DC-DC converter (not shown in the drawings) that lowers the voltage of electric power from the solar battery 15 and supplies the electric power to the auxiliary battery 18. The solar ECU 20 controls power generation states of the solar battery 15 and the respective DC-DC converters.

Figure 2:
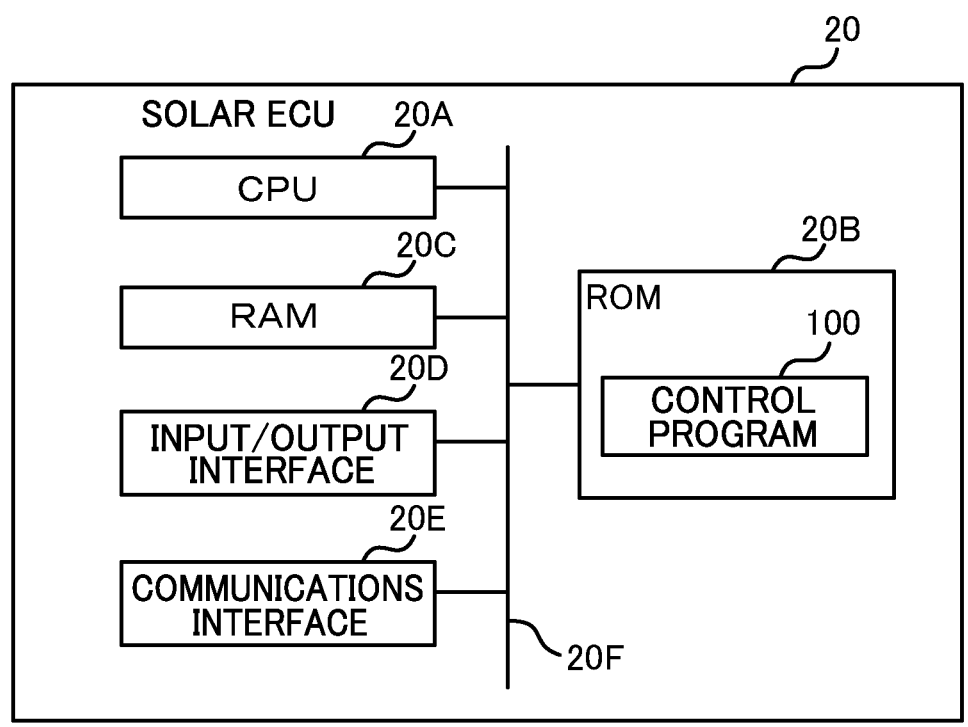
FIG. 2 is a block diagram showing hardware structures of a solar ECU according to the first exemplary embodiment.

As shown in FIG. 2, the solar ECU 20 includes a central processing unit (CPU) 20A, read-only memory (ROM) 20B, random access memory (RAM) 20C, an input/output interface 20D and a communications interface 20E. The CPU 20A, ROM 20B, RAM 20C, input/output interface 20D and communications interface 20E are connected to be capable of communications with one another via an internal bus 20F.

The CPU 20A is a central arithmetic processing unit that executes various programs and controls respective parts. That is, the CPU 20A, which serves as a processor, reads a program from the ROM 20B, which serves as memory, and executes the program using the RAM 20C as a workspace.

The ROM 20B memorizes various programs and various kinds of data. A control program 100 is memorized at the ROM 20B according to the present exemplary embodiment. The control program 100 is a program for controlling the solar ECU 20.

The RAM 20C serves as a work area and temporarily memorizes programs and data.

The input/output interface 20D is an interface for respective communications with the instrument cluster 30 and the car navigation system 32.

The communications interface 20E is an interface for communicating with other ECUs. This interface employs, for example, a communications standard based on the CAN protocol. The instrument cluster 30 is coupled to the solar ECU 20 by the communications interface 20E via an instrument cluster ECU, and the car navigation system 32 is coupled to the solar ECU 20 by the communications interface 20E via a multimedia ECU.

The solar ECU 20 may include storage to serve as memory in addition to the ROM 20B or instead of the ROM 20B. This storage is structured by, for example, a hard disk drive (HDD) or a solid state drive (SSD).

Figure 3:
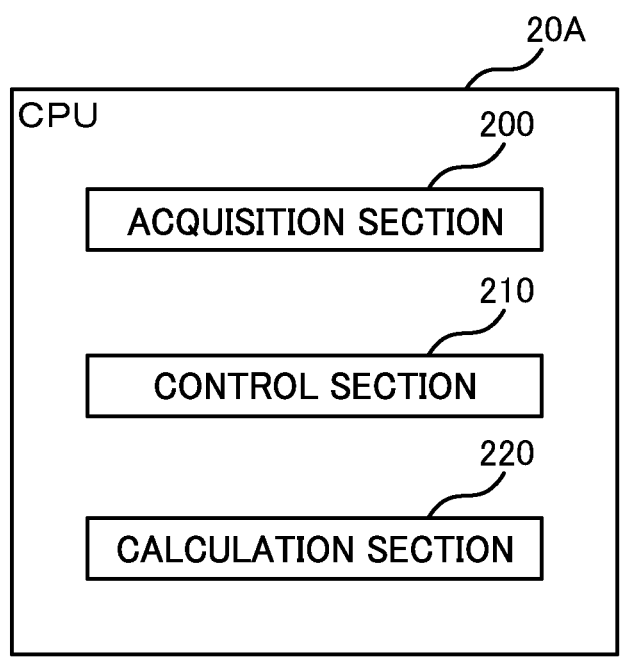
FIG. 3 is a block diagram showing functional structures of a CPU of the solar ECU according to the first exemplary embodiment.

In the solar ECU 20 according to the present exemplary embodiment as shown in FIG. 3, by executing the control program 100, the CPU 20A functions as an acquisition section 200, a control section 210 and a calculation section 220.

The acquisition section 200 includes a function for acquiring momentary power generation amounts of the solar panel 14 mounted at the vehicle 12.

The control section 210 includes a function for displaying states of electric power generated by the solar panel 14 at the instrument cluster 30. The control section 210 according to the present exemplary embodiment changes the area of a display region PA that is displayed at the instrument cluster 30 (see FIG. 5) in accordance with momentary power generation amounts acquired by the acquisition section 200. The control section 210 causes the instrument cluster 30 to display a potential running distance calculated by the calculation section 220.

The calculation section 220 includes a function for calculating potential running distances of the vehicle 12 based on cumulative power generation amounts from the solar panel 14. The calculation section 220 is an example of a vehicle calculation section.

—Flow of Control—

Figure 4:
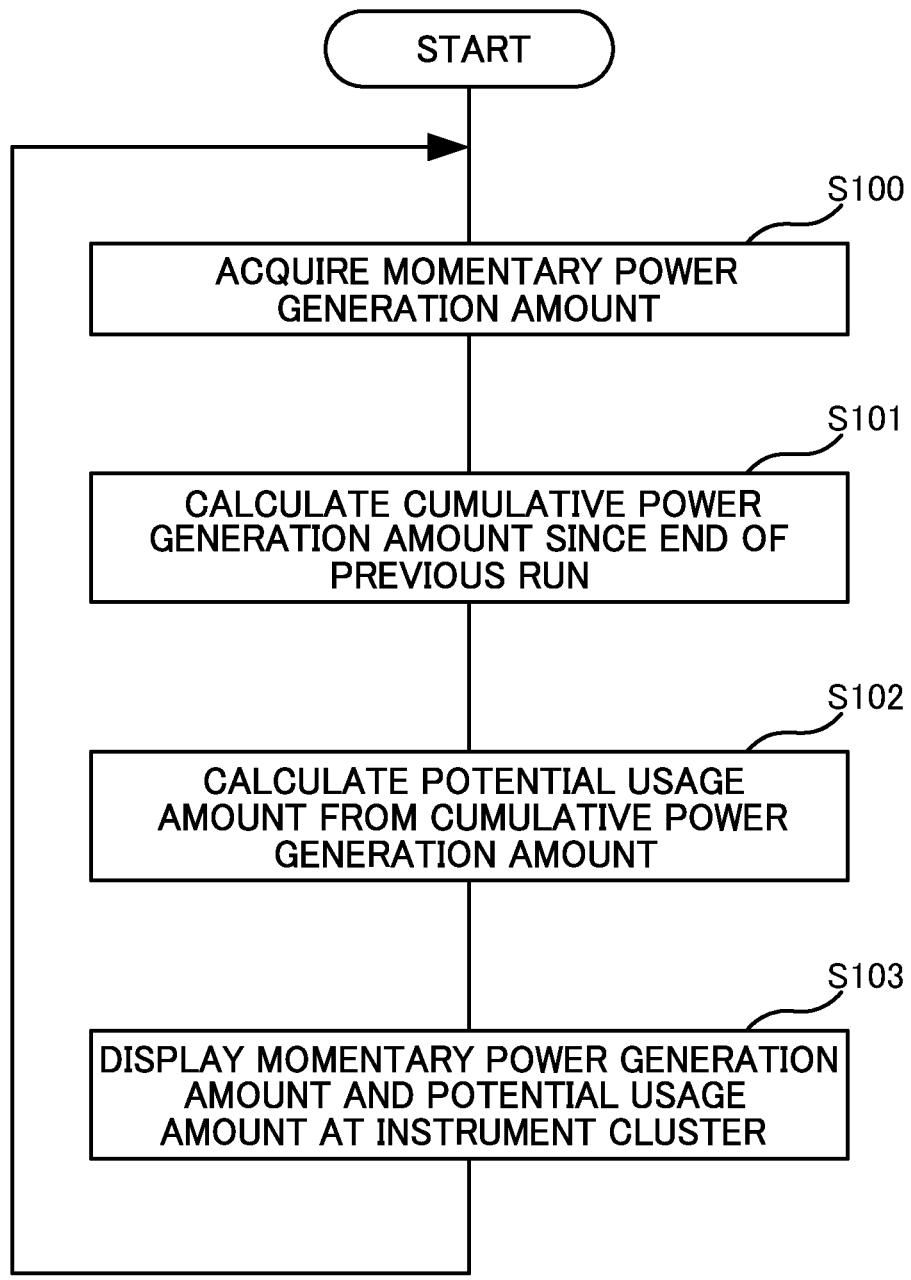
FIG. 4 is a flowchart showing a flow of display control processing according to the first exemplary embodiment.

A flow of display control processing that is executed by the solar ECU 20 according to the present exemplary embodiment is described using the flowchart in FIG. 4. This display control processing is implemented by the CPU 20A functioning as the acquisition section 200, control section 210 and calculation section 220 mentioned above.

In step S100 of FIG. 4, the CPU 20A acquires a momentary power generation amount of the solar panel 14.

In step S101, the CPU 20A calculates a cumulative power generation amount since the end of previous running of the vehicle 12.

In step S102, the CPU 20A calculates a potential usage amount from the cumulative power generation amount. In the present exemplary embodiment, the potential usage amount that is calculated is a potential running distance of the vehicle 12.

In step S103, the CPU 20A displays the momentary power generation amount and the potential running distance serving as a potential usage amount at the instrument cluster 30. Then, the CPU 20A returns to step S100.

Figure 5:
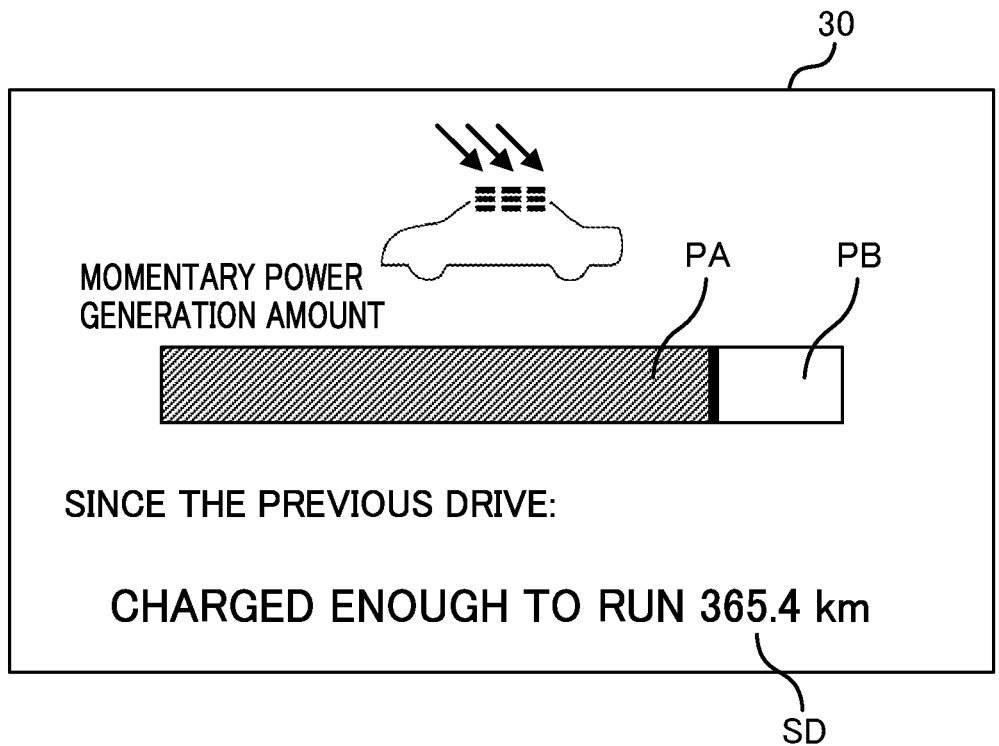
FIG. 5 is an example of a display of an instrument cluster according to the first exemplary embodiment.

As a result of step S103, the display region PA representing the momentary power generation amount and information SD relating to the running distance are displayed at the instrument cluster 30 as illustrated in FIG. 5. The display region PA is displayed as a proportion relative to a maximum region PB, which represents a pre-specified maximum amount. The maximum region PB may represent power that is produced by plentiful power generation by the solar panel 14. The display region PA is displayed so as to be within the maximum region PB even when a momentary power generation amount exceeds the maximum amount corresponding to the maximum region PB.

—Summary of the Exemplary Embodiment—

In the solar ECU 20 according to the present exemplary embodiment, the control section 210 changes the area of the display region PA, which is to say the length of a strip-shaped image, in accordance with momentary power generation amounts acquired by the acquisition section 200. Therefore, according to the present exemplary embodiment, when the solar panel 14 mounted at the vehicle 12 generates power, momentary power generation amounts may be intuitively reported to a vehicle occupant, who is a user of the vehicle 12.

In the solar ECU 20 according to the present exemplary embodiment, when the calculation section 220 calculates a potential running distance of the vehicle 12 based on an amount of power generated by the solar panel 14, the control section 210 displays the potential running distance at the instrument cluster 30. Therefore, according to the present exemplary embodiment, both momentary power generation amounts and a distance that the vehicle 12 may run according to a result of integration of momentary power generation amounts may be provided to the vehicle occupant.

Second Exemplary Embodiment

In the first exemplary embodiment, a potential running distance of the vehicle 12 is displayed at the instrument cluster 30 as the potential usage amount. In the second exemplary embodiment, a potential usage amount of equipment other than the vehicle 12 (below referred to as external equipment) is displayed at the instrument cluster 30 as the potential usage amount. Below, differences from the first exemplary embodiment are described. Structures that are the same are assigned the same reference symbols and detailed descriptions thereof are not given.

Examples of the external equipment of the present exemplary embodiment include portable terminals such as smartphones, personal computers and the like, and domestic appliances such as electric kettles, electric fans and the like.

The control section 210 causes the instrument cluster 30 to display an amount that the external equipment can be used, which is calculated by the calculation section 220. Potential usage amounts encompass durations and numbers of occasions that use is possible.

The calculation section 220 according to the present exemplary embodiment includes a function for calculating potential usage amounts of external equipment based on cumulative power generation amounts from the solar panel 14. The calculation section 220 is an example of an equipment calculation section.

In the display control processing according to the present exemplary embodiment, in step S102 of FIG. 4, a number of times a smartphone that is the external equipment may be charged is displayed as the potential usage amount. In step S103, the CPU 20A displays a momentary charging amount and potential charging cycles of the smartphone, which is the potential usage amount, at the instrument cluster 30.

Figure 6:
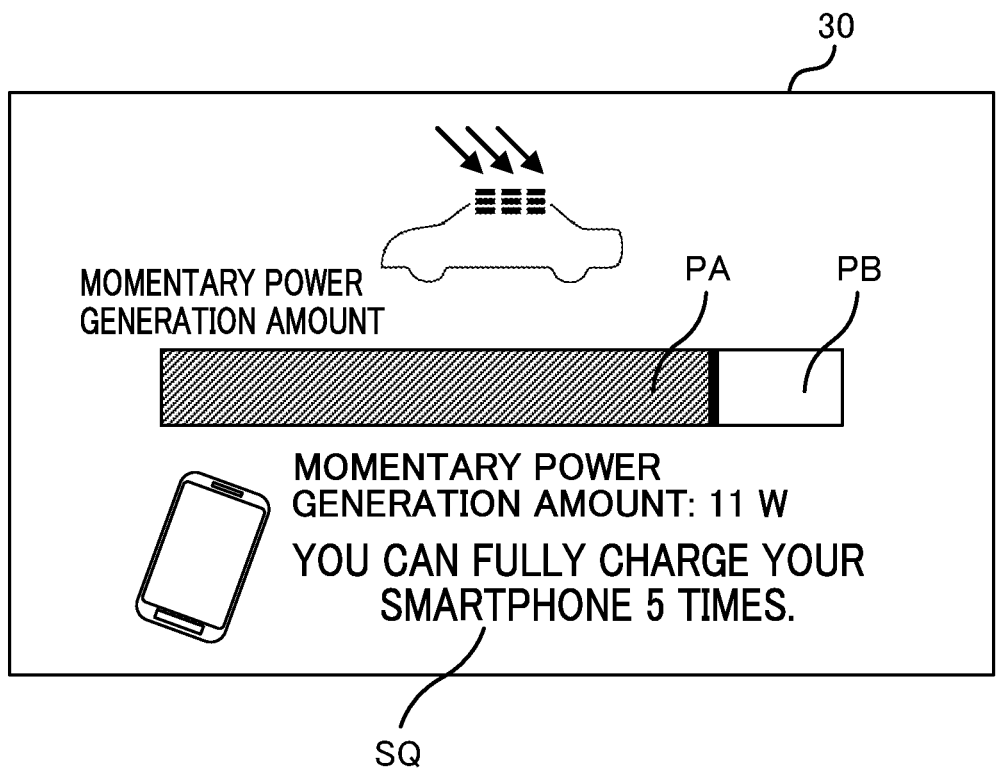
FIG. 6 is an example of a display of an instrument cluster according to a second exemplary embodiment.

As a result of step S103, the display region PA representing the momentary power generation amount and information SQ relating to potential charging cycles of the smartphone are displayed at the instrument cluster 30 as illustrated in FIG. 6.

In the solar ECU 20 according to the present exemplary embodiment, when the calculation section 220 calculates a potential usage amount of external equipment based on an amount of power generated amounts by the solar panel 14, the control section 210 displays the potential charging cycles of the smartphone at the instrument cluster 30. Therefore, according to this display control device, both momentary power generation amounts and amounts that external equipment can be used according to a result of integration of the momentary power generation amounts may be provided to the vehicle occupant who is the user of the vehicle 12.

Third Exemplary Embodiment

In the first and second exemplary embodiments, a potential usage amount is displayed at the instrument cluster 30 together with a momentary power generation amount. In the third exemplary embodiment, when the vehicle 12 is to be parked, information on maximizing a power generation amount of the solar panel 14 is displayed at the instrument cluster 30. Below, differences from the first exemplary embodiment are described. Structures that are the same are assigned the same reference symbols and detailed descriptions thereof are not given.

Figure 7:
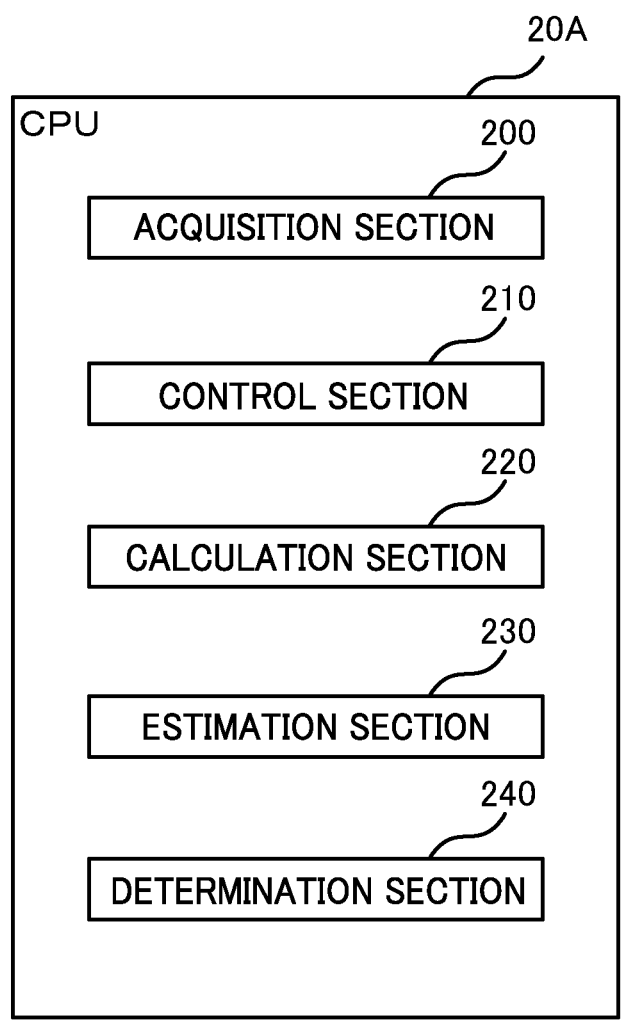
FIG. 7 is a block diagram showing functional structures of a CPU of a solar ECU according to a third exemplary embodiment.

In the solar ECU 20 according to the present exemplary embodiment as shown in FIG. 7, by executing the control program 100, the CPU 20A functions as the acquisition section 200, the control section 210, the calculation section 220, an estimation section 230 and a determination section 240.

In addition to acquiring momentary power generation amounts, the acquisition section 200 according to the present exemplary embodiment includes a function for acquiring data on an orientation of the vehicle 12 and a parking location from the car navigation system 32.

A parking direction of the vehicle 12 is determined by the determination section 240, which is described below. The control section 210 according to the present exemplary embodiment displays information on the parking direction at the instrument cluster 30.

The estimation section 230 includes a function for estimating momentary power generation amounts for each of respective orientations of the vehicle 12. More specifically, the estimation section 230 estimates, for example, momentary power generation amounts for each of sixteen orientations based on a momentary power generation amount for a current orientation of the vehicle 12.

The determination section 240 includes a function for determining, for a predetermined parking location of the vehicle 12, a parking direction of the vehicle 12 at which the momentary power generation amount estimated by the estimation section 230 is largest. For example, when the parking direction is one of advancing or reversing into a parking space in which the vehicle 12 is to be parked, the determination section 240 determines in which parking direction the momentary power generation amount will be larger.

Figure 8:
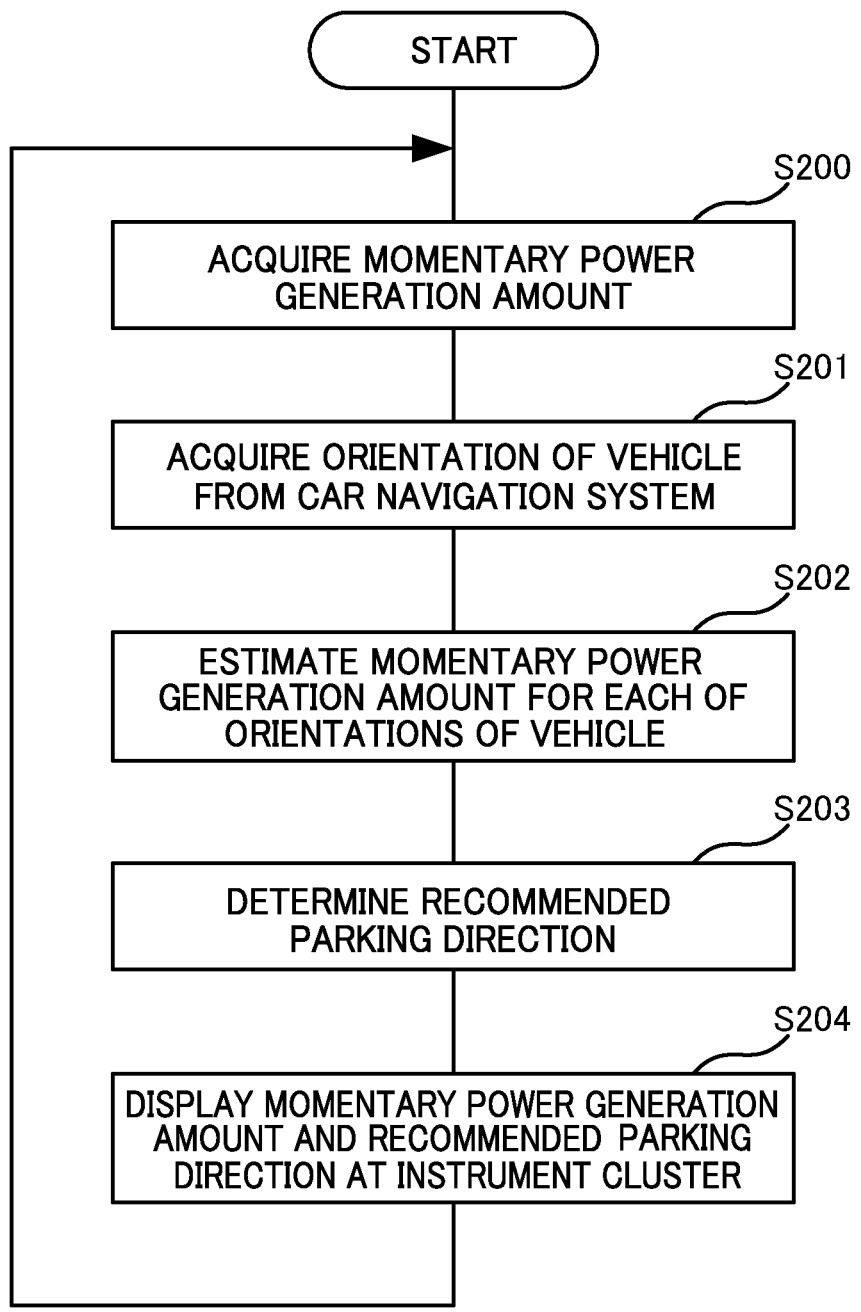
FIG. 8 is a flowchart showing a flow of display control processing according to the third exemplary embodiment.

Now, a flow of display control processing that is executed by the solar ECU 20 according to the present exemplary embodiment is described using the flowchart in FIG. 8. This display control processing is implemented by the CPU 20A functioning as the acquisition section 200, control section 210, calculation section 220, estimation section 230 and determination section 240 mentioned above.

In step S200 of FIG. 8, the CPU 20A acquires a momentary power generation amount of the solar panel 14.

In step S201, the CPU 20A acquires an orientation of the vehicle 12 from the car navigation system 32.

In step S202, the CPU 20A estimates a momentary power generation amount for each of respective orientations of the vehicle 12.

In step S203, the CPU 20A determines a parking direction to recommend for a predetermined parking location.

In step S204, the CPU 20A displays the momentary power generation amount and the recommended parking direction at the instrument cluster 30. Then, the CPU 20A returns to step S200.

Figure 9:
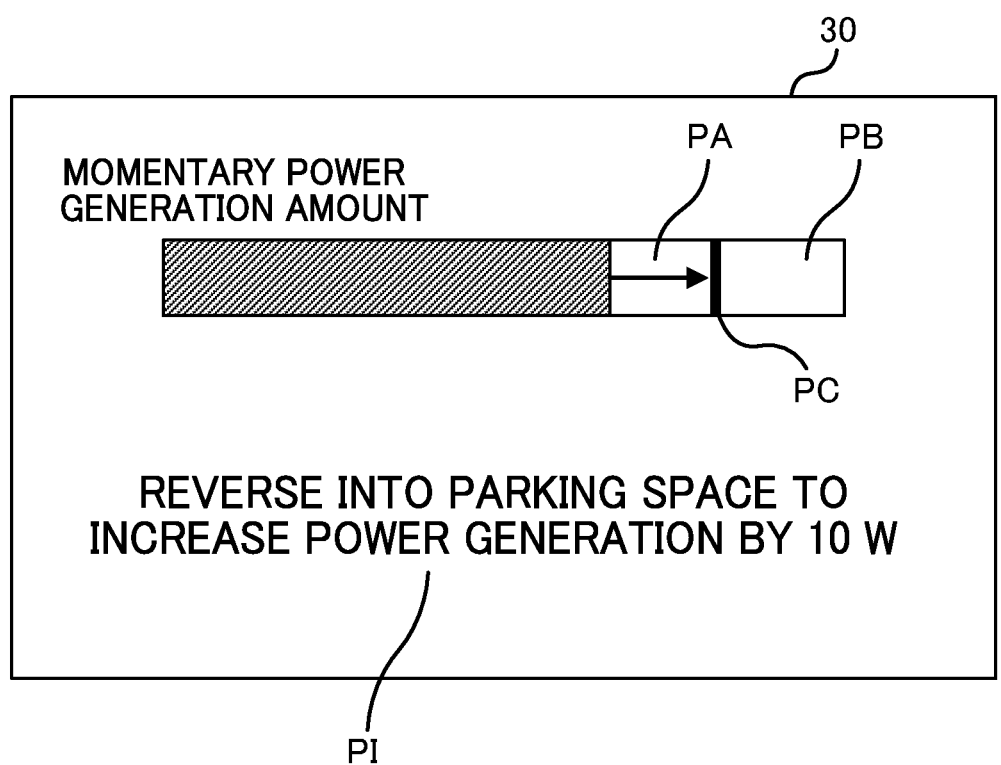
FIG. 9 is an example of a display of an instrument cluster according to the third exemplary embodiment.

As a result of step S204 described above, the display region PA representing the momentary power generation amount, an estimated momentary power generation amount PC and information relating to a recommended parking direction PI are displayed at the instrument cluster 30 as illustrated in FIG. 9. The estimated momentary power generation amount PC is an estimated momentary power generation amount if the vehicle 12 is parked in the recommended parking direction. Together with the recommended parking direction, the information relating to the recommended parking direction PI displays an increase of the momentary power generation amount if the vehicle 12 is parked in the recommended parking direction.

In the solar ECU 20 according to the present direction, the estimation section 230 estimates respective momentary power generation amounts for orientations of the vehicle 12, and the determination section 240 determines a parking direction for a predetermined parking location that provides the largest estimated momentary power generation amount. The control section 210 displays information of the determined parking direction at the instrument cluster 30. According to the present exemplary embodiment, before the vehicle 12 is parked, guidance may be given to a vehicle occupant who is a user of the vehicle 12 about a parking direction at which momentary power generation amounts will be largest. Thus, power generation amounts during parking may be increased.

REMARKS

In the exemplary embodiments described above, information of momentary power generation amounts and the like is displayed at the instrument cluster 30 that is a display part provided in the vehicle 12, but a display part at which information is displayed is not limited thus. For example, a monitor of the car navigation system 32 may serve as the display part and may display information regarding momentary power generation amounts and the like. As another example, a screen of a smartphone may serve as the display part and may display information regarding momentary power generation amounts and the like. In this case, the vehicle 12 may be equipped with a data communication module (DCM) coupled to the communications interface 20E of the solar ECU 20, and the DCM may be coupled to a network such as 5G, LTE, Wi-Fi (registered trademark) or the like and cause the smartphone to display information.

The exemplary embodiments described above may be combined. For example, the first and second exemplary embodiments may be combined to display a potential running distance of the vehicle 12 and potential charging cycles of a smartphone at the instrument cluster 30 at the same time, together with the momentary power generation amount.

In the exemplary embodiments described above, the CPU 20A reads and executes software (programs) but the various processes may be executed by various kinds of processor other than a CPU. Examples of processors in these cases include a PLD, programmable logic device) in which a circuit configuration can be modified after manufacturing, such as an FPGA (field programmable gate array) or the like, a dedicated electronic circuit which is a processor with a circuit configuration that is specially designed to execute specific processing, such as an ASIC (application-specific integrated circuit) or the like, and so forth. The processing described above may be executed by one of these various kinds of processors, and may be executed by a combination of two or more processors of the same or different kinds (for example, plural FPGAs, a combination of a CPU with an FPGA, or the like). Hardware structures of these various kinds of processors are, to be more specific, electronic circuits combining circuit components such as semiconductor components and the like.

In the exemplary embodiments described above, modes are described in which a program is memorized in advance (installed) on a computer readable non-transitory memory medium. For example, the control program 100 of the solar ECU 20 is memorized in advance at the ROM 20B. However, a program may be provided in a mode of being recorded on a non-transitory memory medium such as a CD-ROM (compact disc read-only memory), DVD-ROM (digital versatile disc read-only memory), USB (universal serial bus) memory or the like. Modes are also possible in which the program is downloaded from external equipment via a network.

The flows of processing described in the above exemplary embodiments are examples. Unnecessary steps may be removed, new steps may be added, and processing sequences may be rearranged within a scope not departing from the gist of the disclosure.

What is claimed is:

1. A display control device, comprising a memory and a processor coupled to the memory, the processor being configured to:
    acquire a momentary power generation amount of a solar power generation device mounted at a vehicle; and
    in accordance with the acquired momentary power generation amount, change an area of a display region displayed at a display part of the vehicle,
    wherein the processor is further configured to:
        acquire data on an orientation of the vehicle and a parking location, from a car navigation system coupled to the display control device;
        estimate a momentary power generation amount for each of a plurality of respective orientations of the vehicle, based on the momentary power generation amount for a current orientation of the vehicle;
        in a case in which a parking direction is either advancing or reversing into the parking location in which the vehicle is to be parked, for the parking location, determine the parking direction in which the estimated momentary power generation amount is larger; and
        display information regarding the determined parking direction with the changed area of the display region, at an instrument cluster which is the display part coupled to the display control device.

2. The display control device according to claim 1, wherein the processor is configured to:
    calculate a potential running distance of the vehicle based on an amount of power generated by the solar power generation device; and
    display the potential running distance at the display part.

3. The display control device according to claim 1, wherein the processor is configured to:
    calculate a potential usage amount of equipment other than the vehicle based on an amount of power generated by the solar power generation device; and
    display the potential usage amount at the display part.

4. The display control device according to claim 1, wherein the information regarding the determined parking direction is displayed by using a message containing text.

5. A vehicle, comprising:
    the display control device according to claim 1;
    the solar power generation device, the solar power generation device being coupled to the display control device; and
    the display part; and
    the car navigation system.

6. A display control method to be performed by a processor, the vehicle control method comprising:
    acquiring a momentary power generation amount of a solar power generation device mounted at a vehicle; and
    in accordance with the acquired momentary power generation amount, changing an area of a display region displayed at a display part of the vehicle,
    wherein the display control method further includes:
        acquiring data on an orientation of the vehicle and a parking location, from a car navigation system coupled to the display control device;
        estimating a momentary power generation amount for each of a plurality of respective orientations of the vehicle, based on the momentary power generation amount for a current orientation of the vehicle;
        in a case in which a parking direction is either advancing or reversing into the parking location in which the vehicle is to be parked, for the parking location, determining the parking direction in which the estimated momentary power generation amount is larger; and
        displaying information regarding the determined parking direction with the changed area of the display region, at an instrument cluster which is the display part coupled to the display control device.

7. The display control method according to claim 6, further comprising:

calculating a potential running distance of the vehicle based on an amount of power generated by the solar power generation device; and displaying the potential running distance at the display part.

8. The display control method according to claim 6, further comprising:

calculating a potential usage amount of equipment other than the vehicle based on an amount of power generated by the solar power generation device; and displaying the potential usage amount at the display part.

9. The display control method, according to claim 6, wherein the information regarding the determined parking direction is displayed by using a message containing text.

10. A non-transitory memory medium storing a program executable by a processor to execute a display control process, the process comprising:

acquiring a momentary power generation amount of a solar power generation device mounted at a vehicle; and in accordance with the acquired momentary power generation amount, changing an area of a display region displayed at a display part of the vehicle, wherein the display control process further includes:

acquiring data on an orientation of the vehicle and a parking location, from a car navigation system coupled to the display control device;

estimating a momentary power generation amount for each of a plurality of respective orientations of the vehicle, based on the momentary power generation amount for a current orientation of the vehicle;

in a case in which a parking direction is either advancing or reversing into the parking location in which the vehicle is to be parked, for the parking location, determining the parking direction in which the estimated momentary power generation amount is larger; and displaying information regarding the determined parking direction with the changed area of the display region, at an instrument cluster which is the display part coupled to the display control device.

11. The non-transitory memory medium according to claim 10, wherein the process further comprises:

calculating a potential running distance of the vehicle based on an amount of power generated by the solar power generation device; and displaying the potential running distance at the display part.

12. The non-transitory memory medium according to claim 10, wherein the process further comprises:

calculating a potential usage amount of equipment other than the vehicle based on an amount of power generated by the solar power generation device; and displaying the potential usage amount at the display part.

13. The non-transitory memory medium) according to claim 10, wherein the information regarding the determined parking direction is displayed by using a message containing text.

* * * * *